Feb. 6, 1962 E. M. JONES 3,020,534

OPTICAL ENCODER

Filed April 10, 1958 3 Sheets-Sheet 1

Inventor
Edward M Jones
By: Graf, Nierman & Burmeister
Attorneys

Inventor
Edward M. Jones
Graf, Nierman & Burmeister
Attorneys

Inventor
Edward M. Jones
Graf, Nierman & Burmeister
Attorneys

United States Patent Office 3,020,534

Patented Feb. 6, 1962

3,020,534

OPTICAL ENCODER

Edward M. Jones, Cincinnati, Ohio, assignor to The Baldwin Piano Company, Cincinnati, Ohio, a corporation of Ohio Filed Apr. 10, 1958, Ser. No. 727,649
16 Claims. (Cl. 340—347)

The present invention relates generally to optical encoders.

Optical encoders are commonly used to transform analogue information to digital form. Generally, analogue encoders employ a code disc mounted to a rotatable shaft, and the analogue information is impressed upon the rotatable shaft. The code disc is provided with one or more annular tracks of opaque and transparent sectors coaxially disposed about the center of the code disc. A light source is disposed adjacent to one side of the code disc, and a light responsive cell is positioned on the other side of the code disc to confront each of the tracks on the code disc. During operation of the encoder, the intensity of the light source and the efficiency of the light responsive cells vary. Also light transmission through transparent sectors of the code disc varies as a result of small dirt particles. As a result, the contrast in the electrical response of the cells between darkness and illumination changes, and if the magnitude of this electrical response is reduced below a permissible value, the electronic devices employed to record the response of the cells will not produce responses correlated with the position of the code disc.

One system used to compensate for such changes employs one of the cells confronting the code track as a "reference cell," and the track confronting the reference cell has a width which permits sufficient light to fall upon the photocell to yield an electrical response therefrom which is approximately equal to the response achieved by one of the other cells when receiving fifty percent of total illumination. The output of the reference cell is subtracted from each of the other cells, so that the net signal is either positive or negative depending upon whether the light from the light source is transmitted through an opaque or transparent sector of the code disc. This system is effective to compensate for changes in light intensity and the efficiency of the cells, however, it also results in a lower output from the cells and requires electronic data handling devices which may be actuated from this lower output.

It is one of the objects of the present invention to provide an optical encoder in which changes in light intensity and aging of components over wide ranges will not affect the reliability of the encoder, and in which the electrical response of the encoder is not reduced as a result of any compensation system.

It is clear that amplification can be employed with most encoders to bring the response of the cells to a level which is sufficient to trigger electronic data handling devices. However, circuit noises tend to introduce errors in encoding, and circuit noises become of greater importance with larger amplifications. It is, therefore, a further object of the present invention to provide an optical encoder which reduces the probability of an erroneous response as a result of circuit noises.

These and additional objects of the present invention will become readily apparent to those skilled in the art from a further reading of this disclosure, particularly when viewed in the light of the drawings, in which.

Figure 1:
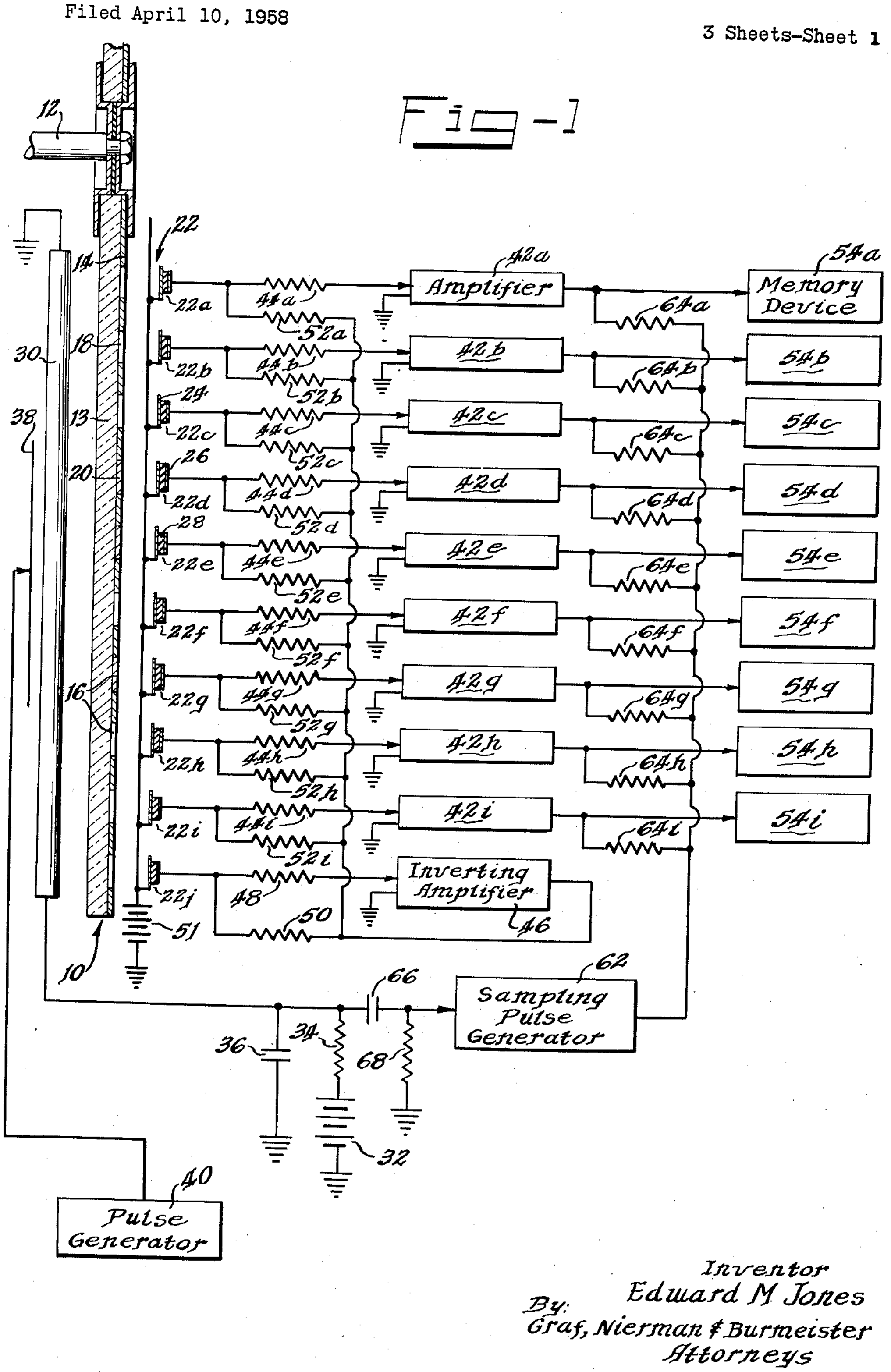
FIGURE 1 is a schematic diagram of an optical encoder constructed according to the teachings of the present invention.

The embodiment of this invention illustrated in FIGURE 1 employs a code disc 10 which is rotatably mounted on a shaft 12. The shaft 12 is adapted to be coupled to a mechanical source of analogue information which is to be coded. It is to be understood that the encoding member need not be a rotatable member but could also be a translatable member. The code disc 10 has a transparent base 13 and is provided with an opaque layer 14 on one side thereof. The layer 14 is provided with a plurality of coaxial spaced tracks 16, and the tracks have transparent sectors 18 and opaque sectors 20 which are arranged to represent a suitable code. In order to simplify illustration of the encoder, only ten tracks are shown on the disc 10, although it is to be understood that more or fewer tracks may be employed. Code discs of this type are well known in the art and fully described in the inventor's copending application entitled "Optical Encoder," Serial No. 655,653.

A cell responsive to light confronts each of the tracks 16 of the code disc 10, these cells being designated *22a*, *22b*, *22c*, *22d*, *22e*, *22f*, *22g*, *22h*, and *22i*. Each of these cells has a pair of confronting electrodes 24 and 26, and a mass of semi-conductor material 28 is disposed therebetween. The cells, collectively referred to as 22, are identical.

A light source in the form of a flash lamp 30 is disposed on the opposite side of the code disc 10. The flash lamp is connected in a series circuit with a potential source, such as a battery 32, and resistor 34, and the power source 32 and resistor 34 are by-passed by a capacitor 36. The flash lamp 30 has a firing electrode 38 which is connected to a pulse generator 40.

The electrode 26 of each of the cells *22a*, *22b*, *22c*, *22d*, *22e*, *22f*, *22g*, *22h* and *22i* is connected to the input of amplifiers *42a*, *42b*, *42c*, *42d*, *42e*, *42f*, *42g*, *42h*, and *42i* through series resistors *44a*, *44b*, *44c*, *44d*, *44e*, *44f*, *44g*, *44h*, and *44i*, respectively. The electrode 26 of the cell *22j* is connected to the input of an inverting amplifier 46 through a series resistor 48, and a resistor 50 connected between the output of the inverting amplifier and the cell *22j* provides negative feedback to stabilize the inverting amplifier. The electrode 24 of each of the cells 22 is connected to the grounded input terminal of each of the amplifiers and inverting amplifier 46 through a power source, or battery 51. Each of the cells *22a* through *22i* is connected to the output of the inverting amplifier 46 through series resistors *52a* through *52i*, respectively. The outputs of each of the amplifiers *42a* through *42i* are connected to the input of memory devices *54a* through *54i*, respectively. Sampling of the information stored by the memory devices may be accomplished according to presently known techniques, or by the techniques described in the aforementioned patent application.

A sampling pulse generator 62 is connected to the input of each of the memory devices *54a* through *54i* through a series resistor *64a* through *64i*, respectively. The sampling pulse generator 62 is also coupled to the flash lamp 30 through a differentiating circuit having a series connected capacitor 66 and parallel connected resistor 68, and is thus locked in with the flashing of the light source.

It may be a synchronized blocking oscillator or multivibrator.

Figures 3, 4:
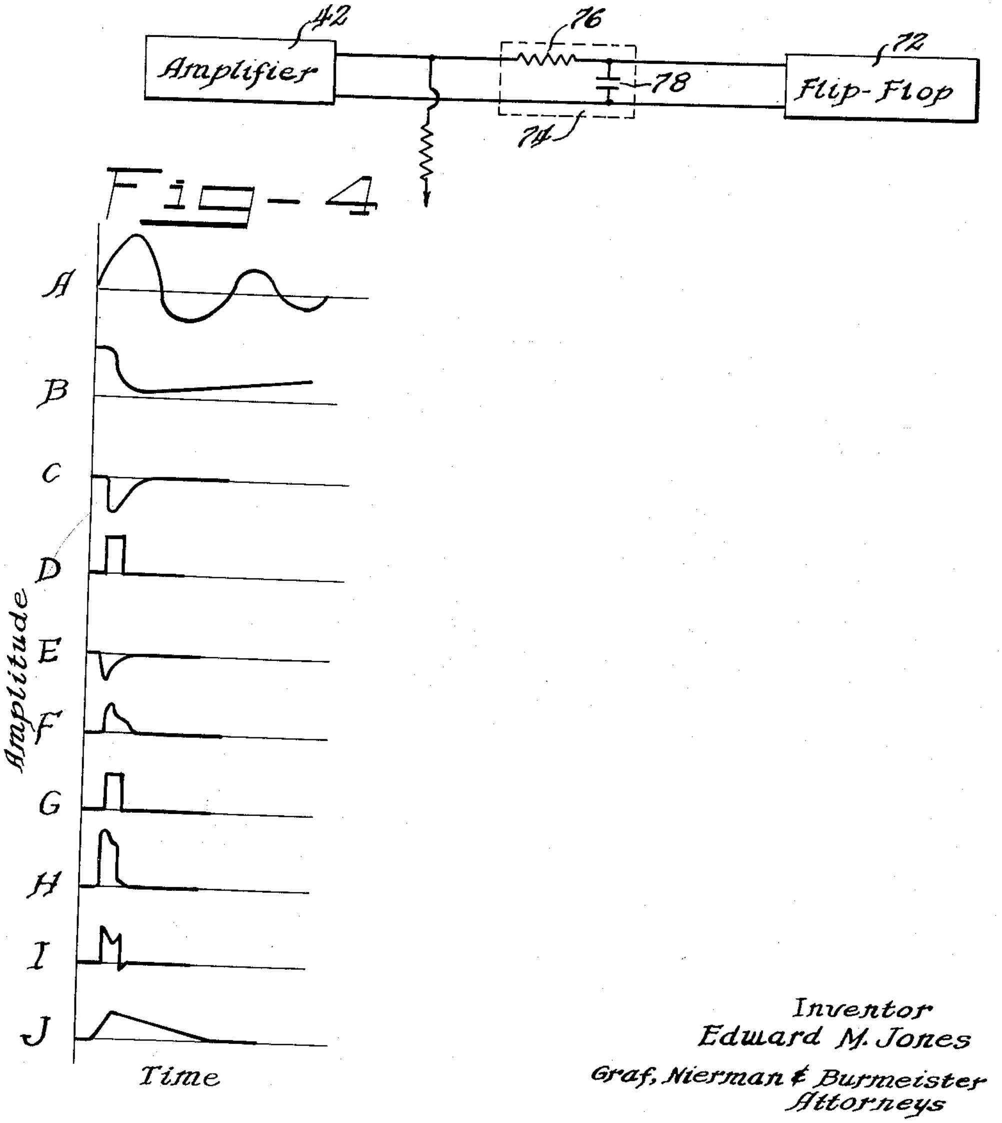
FIGURE 3 is a fragmentary electrical circuit diagram of another modified encoder similar to that illustrated in FIGURE 1.
FIGURE 4 is a graph illustrating the time-amplitude relationship of the electrical signals produced at different points of the encoder illustrated in FIGURE 1.

Operation of the encoder illustrated in FIGURE 1 will be more readily understood by reference to the potential pulse forms illustrated in FIGURE 4. The pulse generator 40 produces a decaying sinusoidal wave with only an initial positive portion of sufficient amplitude to trigger the flash lamp 30. This curve appears at FIGURE 4(A). The potential applied to the differentiating circuit having capacitor 66 and resistor 68 is shown at FIGURE 4(B), and differentiated pulse applied to the sampling pulse generator 62 produces a short square wave pulse, as illustrated at FIGURE 4(D), and the leading edge of the pulses from the sampling pulse generator occurs at essentially the same time that the flash lamp 30 is triggered. The sampling pulse generator 62 produces square wave pulses of shorter duration than the period of persistency of the light flash, such as a five microsecond pulse, and the amplitude of the pulses produced by the sampling pulse generator is selected to barely trigger the memory devices 54*a* through 54*i*. The sampling pulse is thus synchronized to occur only during the period of greatest light intensity from the flash lamp.

The reference cell 22*j* produces an electrical response continuously which is equal to the response of one of the other cells when illuminated by approximately fifty percent of normal full illumination. The inverting amplifier 46 inverts the output of the cell 22*j*. The output of the inverting amplifier 46 is illustrated at FIGURE 4(E). The response of the other cells 22*a* through 22*i* will depend upon the illumination being received by the cell.

The electrical output from the amplifiers 42*a* through 42*i* just due to an illuminated cell is illustrated in FIGURE 4 at (F). This response is added to the sampling pulse from the sampling generator 62 shown at FIGURE 4(G), which is also impressed on the input of the memory devices. As indicated at (H) in FIGURE 4, this combined pulse is of sufficient amplitude to trigger the memory device associated with an illuminated cell. However, the sampling pulse will not trigger the memory devices in the event the response appearing in the output of the amplifiers 42*a* through 42*i* is negative. This condition occurs when the response of the reference cell is greater than the response of the other cell in question, and this effect occurs when the cell in question confronts an opaque sector of the track of the code disc. The pulse resulting from the combined sample pulse and a non-illuminated cell at the memory device is illustrated at FIGURE 4(I), and constitutes a "0" of the binary code.

Figure 2:
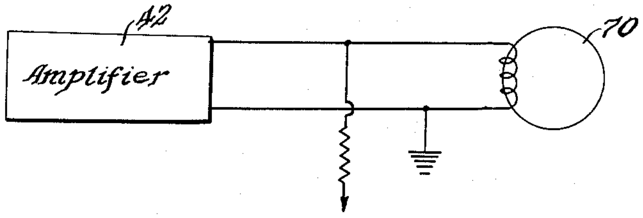
FIGURE 2 is a fragmentary electrical circuit diagram of a modified form of the encoder illustrated in FIGURE 1.

It is to be noted that the response of the cells has a shape which is irregular, and as a result it is possible for a "0" pulse to erroneously trigger the memory circuit due to a peak of the pulse having sufficient amplitude. Erroneously triggering of the memory circuits can be substantially eliminated by employing an integrating means between the memory devices and the amplifier. If, as in FIGURE 2, each amplifier 42 is connected to a memory device in the form of a magnetic core shift register 70, such as manufactured by the Raytheon Manufacturing Co., the pulses impressed upon the shift register 70 will be integrated due to the inherent properties thereof. Such a shift register has a plurality of stages with magnetic cores and exhibits an accurate and sharp threshold. If a flip flop circuit, such as illustrated in FIGURE 3 at 72, is connected to the output of each amplifier 42, it is desirable to provide an integrating circuit 74 in series with the amplifier 42 and flip flop 72. The integrating circuit 74 may consist of a series resistor 76 and parallel capacitor 78. When employing an integrating device between the amplifier and the memory device, the memory device may be adjusted to the peak value of the pulse impressed thereon, as illustrated at (J) in FIGURE 4.

The amplitude of the sampling pulse must be greater than circuit noise, and preferably is of just sufficient amplitude to trigger the memory device. However, the amplitude of the signals appearing in the output of the amplifiers 42 may be larger or smaller than the sampling pulse.

The exact amplification of the responses of the cells 22 is not critical, but the amplification of the reference cell 22*j* is critical because of the fact that a digital "0" appears at any time the response resulting from the reference cell 22*j* exceeds the response of one of the other cells. For this reason, the inverting amplifier 46 must be stable, and this is achieved by providing substantial feedback through the resistor 50. Further, the light intensity can vary without affecting the accuracy of the encoder, as long as the intensity remains above a threshold value. Suitable amplitudes, as measured at the input of the memory device, may be as follows:

| | | |
|---|---|---|
| Signal from reference cell alone | volts | −2½ |
| Signal from an illuminated cell | do | +5 |
| Signal from the sampling pulse generator **62** | do | +1 |
| Trigger threshold for shift register | do | +1 |

Such a system would probably still be operable if the light intensity dropped by a factor as much as 10, causing the reference cell signal to decrease to one-quarter volt and the illuminated cell signal to be only one-half volt. In practice, the amplifiers 42 are generally disposed in the housing for the code disc 10, and hence must be small in size. The inventor has found that three stage transistor amplifiers are suitable and provide adequate amplification with photoconductive cells, such as cadmium selenide cells or with junction type cells such as germanium or silicon n-p cells. Other suitable cells are described in the above application.

Figure 5:
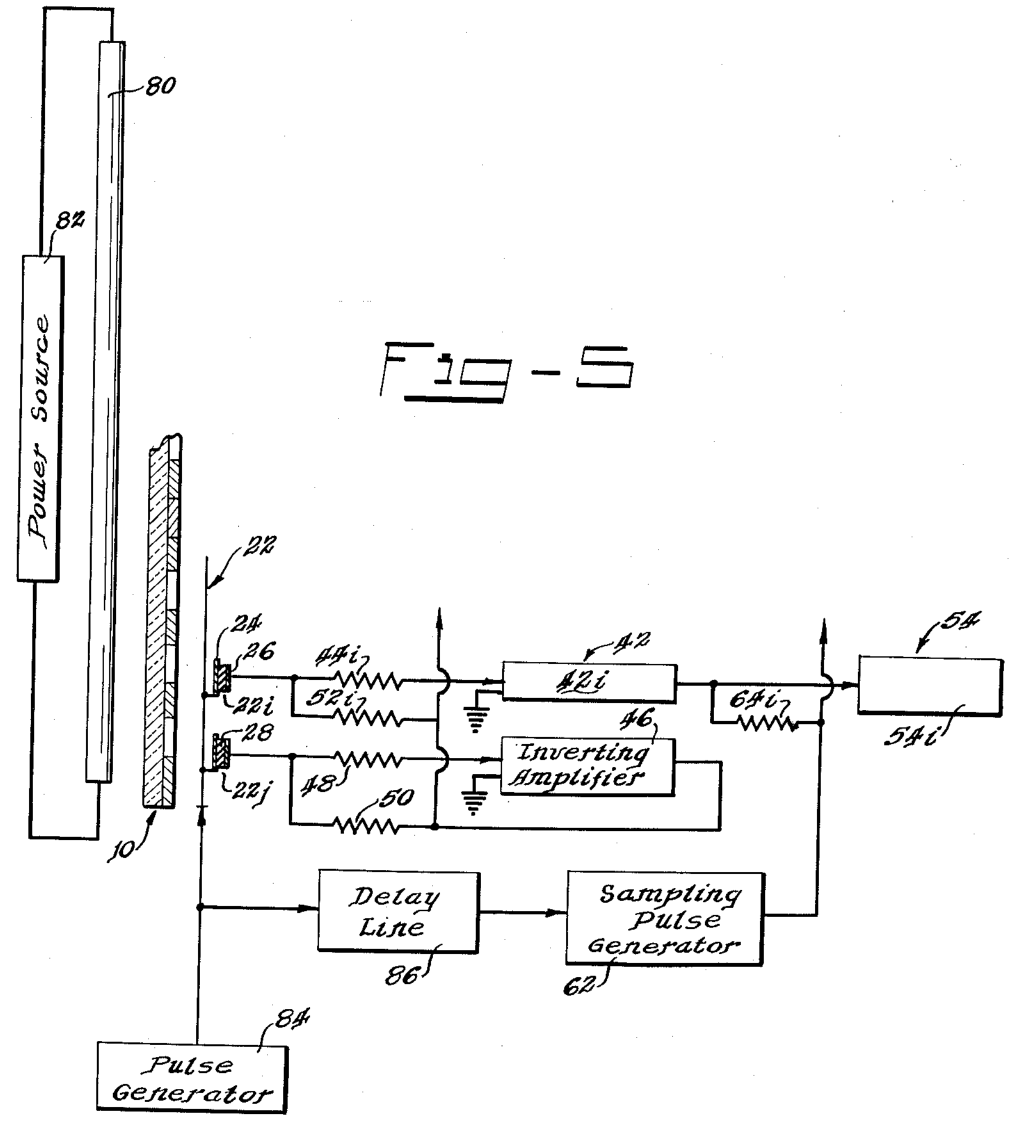
FIGURE 5 is a fragmentary schematic diagram of an encoder constituting another embodiment of the present invention.

FIGURE 5 illustrates a modified embodiment of the present invention, and sets forth an encoder employing a lamp 80 which is continuously excited by a power source 82 to illuminate the code disc 10 continuously. In this embodiment of the invention, elements which are identical to those illustrated in FIGURES 1, 2 and 3 bear the same reference numerals. The lamp 80 is positioned relative to the disc in the same position as the lamp 30 illustrated in FIGURE 1.

Since the circuit interconnecting the light responsive cells 22, the amplifiers 42, and the memory devices 54 are identical to those previously described, FIGURE 5 only illustrates the cell 22*i* connected to the amplifier 42*i* and memory device 54*i*, and the cell 22*j* connected to the inverting amplifier 46, although it is to be understood that the device employs the other cells, amplifiers, and memory devices illustrated in FIGURE 1.

A pulse generator 84 is connected to the interconnected electrodes 24 of the cells 22, and periodically applies a potential in series with the input circuits of the amplifiers 42 and the cells 22. The pulse generator 84 periodically applies the same pulse in series with the input of the inverting amplifier 46 and the cell 22*j*. The pulse generator 84 is also connected to the input of the sampling pulse generator 62 through a delay line 86. The amplitudes of the pulses generated by the sampling pulse generator 62, as in the former embodiment, are approximately equal to the threshold value of the memory devices 54. For a more detailed description of the operation and construction in an encoder which pulses the cells thereof for sampling purposes, reference is made to the application of the present inventor entitled "Optical Encoder," Serial No. 655,653, filed April 29, 1957.

The purpose of the delay line 86 is to provide a time interval between impressing the periodic pulses from the pulse generator 84 on the cells 22 and triggering of the sampling pulse generator 62. As is fully explained in the inventor's application referred to above, the cells 22 produce capacity effects which make it desirable to sample the trailing portions of the pulse, rather than the leading ing portions, and this is accomplished by the delay line 86.

The amplifiers 42 may be either of the alternating current or direct current type. If the pulse generator 84 of the embodiment of FIGURE 5 is replaced by a direct current source, the amplifier 42 must be a direct current amplifier and the slower time constant of the direct current amplifier will not adversely affect the operation of the encoder.

FIGURE 1 discloses a sampling means in the form of a flashing light source which comprises the lamp 30, firing electrode 38, and pulse generator 40. This sampling means limits the electrical response of those photocells confronting transparent sectors of the code disk 10 to those time periods of the light flash. The term "sampling" is here used to designate the interval during which data is derived from the code disk, as fully described in chapter II of "Notes on Analog-Digital Conversion Techniques" edited by Alfred K. Susskind, John Wiley and Sons, Inc., 1957. The pulse generator 62 is synchronized to produce pulses which occur during the sampling period and control actuation of the memory device, but the pulse geenrator 62 is not itself a sampling means. In FIGURE 5, the sampling means is the pulse generator 84 which is connected in a series circuit with each of the photocells 22 and the input of the amplifier connected to each photocell. Again, the pulse generator 62 is synchronized with the sampling means to control the memory devices.

From the foregoing disclosure, those skilled in the art will readily devise modifications and other devices employing the invention set forth. It is, therefore, intended that the scope of the present invention be not limited by the foregoing disclosure, but rather only by the appended claims.

The invention claimed is:

1. An encoder comprising, in combination, a coding member having a plurality of tracks with opaque and transparent sectors adapted to be positioned in response to a signal to be coded, a pulsed light source disposed on one side of the coding member, a cell producing an electrical response related to the magnitude of illumination thereof confronting each track, a reference cell confronting the light source, means for inverting the electrical response of the reference cell and coupling said response to each of the other cells, an essentially square wave pulse generator coupled to each of the other cells, means synchronizing the pulse generator to the light source, and a memory device connected to each of the other cells.

2. An encoder comprising, in combination, a code disc having a plurality of coaxial tracks with opaque and transparent sectors adapted to be positioned in response to a signal to be coded, a pulsed light source disposed on one side of the coding disc, a cell producing an electrical response related to the magnitude of illumination thereof confronting each track, means inverting the electrical response of one of the cells and coupling said response to each of the other cells, an essentially square wave pulse generator coupled to each of the other cells, means synchronizing the pulse generator to the light source, and a memory device connected to each of the other cells.

3. An encoder comprising, in combination, a code disc having a plurality of coaxial tracks with opaque and transparent sectors and a transparent track adapted to be positioned in response to a signal to be coded, a light source disposed on one side of the code disc, a cell producing an electrical response related to the magnitude of illumination thereof confronting each track, the cell confronting the transparent track being called a reference cell, means inverting the electrical response of the reference cell and coupling said response to each of the other cells, an essentially square wave pulse generator coupled to each of the other cells, a trigger pulse generator coupled to the square wave pulse generator and light source, and a memory device connected to each of the other cells.

4. An electrical circuit comprising, in combination, a plurality of light sensitive cells having a pair of confronting electrodes and a mass of semiconductor material disposed therebetween, a flash lamp confronting the cells, an inversion amplifier electrically connected between the first of the cells and each of the other cells, a memory device electrically coupled to each of the other cells responding to pulses having amplitudes greater than a threshold value, and means for simultaneously actuating the flash lamp and impressing a pulse on the input of each memory device having an amplitude less than the arithmetic sum of the threshold value and the amplitude of the response from the first cell, whereby actuation of each memory device is controlled by the response of said other cell coupled thereto.

5. An electrical circuit comprising, in combination, a plurality of light responsive cells having a pair of confronting electrodes and a mass of semiconductor material disposed therebetween, a flash lamp confronting the cells, an inversion amplifier electrically connected between the first of the cells and each of the other cells, a shift register electrically coupled to each of the other cells responding to pulses having amplitudes greater than a threshold value, a trigger pulse generator electrically connected to the flash lamp, and a sampling pulse generator coupled to the trigger pulse generator and electrically connected to the input of each shift register having an amplitude essentially equal to the threshold value, whereby actuation of each shift register is controlled by the response of the other cell coupled thereto.

6. An electrical circuit comprising, in combination, a plurality of light responsive cells having a pair of confronting electrodes and a mass of semiconductor material disposed therebetween, a flash lamp confronting the cells, an inversion amplifier electrically connected between the first of the cells and each of the other cells, a plurality of flip flops equal in number to the number of the other cells each having an input, an integrating circuit connected between the input of each flip flop and one of the other cells, a trigger pulse generator electrically connected to the flash lamp, and a sampling pulse generator coupled to the trigger pulse generator and electrically connected to the input of each flip flop, said sampling pulse generator producing pulses having an amplitude less than the arithmetic sum of the threshold value and the amplitude of the response from the first cell, whereby actuation of each flip flop is correlated to the response of the other cell coupled thereto.

7. An encoder comprising, in combination, a coding member having a plurality of tracks with opaque and transparent sectors adapted to be positioned in response to a signal to be coded, a light responsive cell disposed on one side of the coding member confronting each track thereof, each cell having a pair of confronting electrodes and a mass of semiconductor material disposed therebetween, a flash lamp having a triggering element disposed on the other side of the coding member aligned with the cells, an inversion amplifier having an input electrically connected to the first of the cells, a resistor connected between each of the other cells and the output of the inversion amplifier, a feedback resistor connected between the output and input of the inversion amplifier, an amplifier having an input coupled to each of the other cells and an output, a memory device connected to the output of each amplifier, a flash lamp circuit including, in series, the flash lamp, a direct current power source and a resistor, a pulse generator connected to the triggering element of the flash lamp, a differentiating circuit connected in parallel with the resistor of the flash lamp circuit, a sampling pulse generator having an input connected to the differentiating circuit and an output, and a resistor connected to the output of each amplifier and to the output of the sampling pulse generator.

8. An encoder comprising, in combination, a coding member having a plurality of tracks with opaque and transparent sectors adapted to be positioned in response to a signal to be coded, a light responsive cell disposed on one side of the coding member confronting each track thereof, each cell having a pair of confronting electrodes and a mass of semiconductor material disposed between the electrodes, a flash lamp having a triggering element disposed on the other side of the coding member aligned with the cells, an inversion amplifier having an input electrically connected to the first of the cells, a resistor connected between each of the other cells and the output of the inversion amplifier, a feedback resistor connected between the output and input of the inversion amplifier, an amplifier having an input coupled to each of the other cells and an output, a magnetic core shift register having a response threshold connected to the output of each amplifier, a flash lamp circuit including, in series, the flash lamp, a direct current power source and a resistor, a pulse generator connected to the triggering element of the flash lamp, a differentiating circuit connected in parallel with the resistor of the flash lamp circuit, a sampling pulse generator having an input connected to the differentiating circuit and an output, and a resistor connected to the output of each amplifier and to the output of the sampling pulse generator.

9. An encoder comprising, in combination, a coding member having a plurality of tracks with opaque and transparent sectors adapted to be positioned in response to a signal to be coded, a light responsive cell disposed on one side of the coding member confronting each track thereof, each cell having a pair of confronting electrodes and a mass of semiconductor material disposed between the electrodes, a flash lamp having a triggering element disposed on the other side of the coding member aligned with the cells, an inversion amplifier having an input electrically connected to the first of the cells, a resistor connected between each of the other cells and the output of the inversion amplifier, a feedback resistor connected between the output and input of the inversion amplifier, an amplifier having an input coupled to each of the other cells and an output, an integrating circuit connected to the output of each amplifier, a flip flop circuit connected to each of said integrating circuits, a flash lamp circuit including, in series, the flash lamp, a direct current power source and a resistor, a pulse generator connected to the triggering element of the flash lamp, a differentiating circuit connected in parallel with the resistor of the flash lamp circuit, a sampling pulse generator having an input connected to the differentiating circuit and an output, and a resistor connected to the output of each amplifier and to the output of the sampling pulse generator.

10. An encoder comprising, in combination, a coding member having a plurality of tracks with opaque and transparent sectors adapted to be positioned in response to a signal to be coded, a light source disposed on one side of the coding member, a cell producing an electrical response related to the magnitude of the illumination thereof confronting each track, a reference cell confronting the light source, means for inverting the electrical response of the reference cell and coupling said response to each of the other cells, a memory device having an input connected to each of the other cells, said memory devices responding only to electrical signals greater than a threshold value, an essentially square wave pulse generator coupled to the input of each memory device and impressing thereon a pulse of a magnitude approximately equal to the threshold value, and means for periodically sampling the position of the code member including an electrical pulse generator, said pulse generator being coupled electrically to the square wave pulse generator.

11. An encoder comprising, in combination, a code disc having a plurality of coaxial tracks with opaque and transparent sectors adapted to be positioned in response to a signal to be coded, a continuous source of light disposed on one side of the coding disc, a cell producing an electrical response related to the magnitude of illumination thereof confronting each track on the other side of the code disc from the light source, means for inverting the electrical response of one of the cells and coupling said response to each of the other cells, a memory device having an input connected to each of the other cells, an essentially square wave sampling pulse generator coupled to the input of each memory device and impressing thereon a pulse of a magnitude approximately equal to the threshold value, means for periodically sampling the position of the code disc including an electrical pulse generator electrically connected in series with each of the cells, and a delay line connected between the pulse generator and the sampling pulse generator, said sampling pulse generator being triggered in response to pulses from the pulse generator.

12. An encoder comprising, in combination, a code disc having a plurality of coaxial tracks with opaque and transparent sectors and a transparent track adapted to be positioned in response to a signal to be coded, a continuous light source disposed on one side of the code disc, a cell producing an electrical response relative to the magnitude of illumination thereof confronting each track, the cell confronting the transparent track being called a reference cell, means for inverting the electrical response of the reference cell and coupling said response to each of the other cells, a memory device having an input connected to each of the other cells, said memory device responding only to electrical signals greater than a threshold value, an essentially square wave pulse generator coupled to the input of each memory device and impressing thereon a pulse of a magnitude approximately equal to the threshold value, and means for periodically sampling the position of the code disc including an electrical pulse generator connected in series with each of the other cells, said pulse generator being connected to the sampling pulse generator and triggering the sampling pulse generator.

13. An encoder comprising the elements of claim 11 wherein the memory devices comprise shift registers.

14. An encoder comprising the elements of claim 11 wherein the memory devices comprise flip flop circuits.

15. An electrical circuit comprising the elements of claim 10 wherein each cell comprises a pair of confronting electrodes and a mass of semiconductor material disposed therebetween.

16. An encoder comprising, in combination, a coding member having a plurality of tracks with opaque and transparent sectors adapted to be positioned in response to a signal to be encoded, a light source disposed on one side of the coding member, a cell producing a first electrical response under illumination from the light source and a second electrical response when obscured from the light source by the code member confronting each track, means for limiting the electrical response of each cell to short time periods, a memory device having an input connected to each of the cells, said memory devices responding only to electrical signals greater than a threshold value, an essentially square wave generator coupled to the input of each memory device, the algebraic sum of the electrical responses of each cell and the magnitude of the pulse from said square wave generator being less than the threshold value of the memory device associated with said cell except during said periods of electrical response, and means for synchronizing the square wave pulse generator with the periods of electrical response of the cells.

References Cited in the file of this patent

UNITED STATES PATENTS

| | | |
|---|---|---|
| 2,677,815 | Brustman | May 4, 1954 |
| 2,679,644 | Lippel et al. | May 25, 1954 |
| 2,685,054 | Brenner et al. | July 27, 1954 |
| 2,754,502 | Dickinson | July 10, 1956 |
| 2,755,020 | Belcher et al. | July 17, 1956 |
| 2,793,807 | Yaeger | May 28, 1957 |
| 2,830,191 | McCollom et al. | Apr. 8, 1958 |
| 2,910,684 | Jones | Oct. 27, 1959 |